3,488,107
HIGH-DEFINITION TELEPHOTO LENS
Jean Michel Baluteau and Pierre Coussot, Livry-Gargan, France, assignors to Societe d'Optique, Precision, Electronique et Mecanique, Paris, France
Filed Sept. 13, 1967, Ser. No. 669,641
Claims priority, application France, Sept. 26, 1966, 77,628
Int. Cl. G02b 9/00
U.S. Cl. 350—214          4 Claims

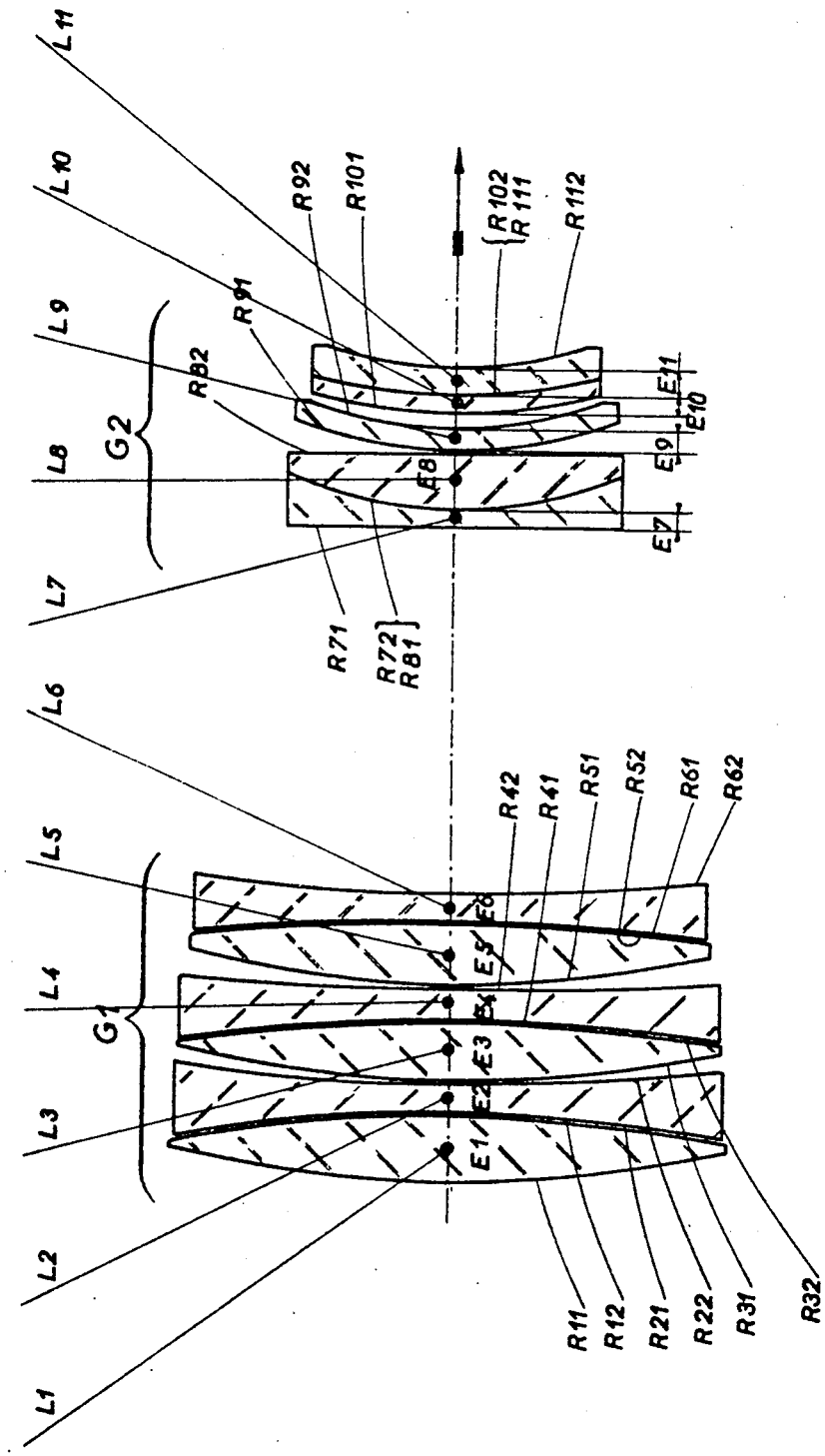

ABSTRACT OF THE DISCLOSURE

A high-definition telephoto lens comprising two lens groups G1 and G2 having six elements respectively. The six elements of the group G1 are, going towards the film, a first biconvex convergent element, a second biconcave divergent element, a third biconvex convergent element, a fourth biconcave divergent element, a fifth biconvex convergent element and a sixth divergent element; and the five elements of the group G2 are, going towards the film, a seventh plane-concave element, an eighth plane-convex element, a ninth divergent meniscoid element, a tenth convergent meniscoid element and an eleventh divergent meniscoid element. This telephoto lens, which has a high separating power, is of use more particularly for photography from satellites.

---

The invention relates to a telephoto lens, particularly to a high-definition telephoto lens—i.e., a telephoto lens having a high resolving power—of use more particularly but not solely for photography from satellites.

One form of telephoto lens comprises a convergent group of lens elements and a divergent group of lens elements, separated by a space large enough for the resulting focal distance to be appreciably greater than the total size of the system. A common disadvantage of this feature is that the divergent group may amplify aberrations of the convergent group.

According to the invention, there is provided a telephoto lens for use in conjunction with an image-receiving surface, consisting of two lens groups designated G1 and G2, of which the lens group G2 is arranged to be the nearer one to said surface, the lens groups G1 and G2 having six and five elements respectively, the six elements of the group G1 being a convergent group formed by, going towards the image-receiving surface, a first biconvex convergent element, a second biconcave divergent element, a third biconvex convergent element, a fourth biconcave divergent element, a fifth biconvex convergent element and a sixth biconcave divergent element, and the five elements of the group G2 being a divergent group formed by, going towards the image-receiving surface, a seventh plano-concave element, an eighth plano-convex element, a ninth divergent meniscoid element, a tenth convergent meniscoid element and an eleventh divergent meniscoid element.

The invention will now be described by way of example with reference to the accompanying drawing, of which the single figure is a diagrammatic view of a telephoto lens in accordance with the invention.

The illustrated telephoto lens comprises two groups of lens elements. Group G1 has a positive resultant focal length F1, that is to say, it is a convergent group, the maximum and minimum values of the focal length F1 of lens group G1 being defined by the double inequality:

$$\frac{2F}{5} \leq F1 \leq \frac{3F}{5}$$

where F is the focal length of the complete telephoto lens.

The second lens group G2 has a negative resultant focal length F2, that is to say, it is a divergent group, the maximum and minimum values of the focal length F2 of lens group G2 being defined by the double inequality:

$$\frac{2F}{5} \leq |F2| \leq \frac{3F}{5}$$

A space $d$ exists between the main image plane of the lens group G1 and the main object plane of the lens group G2, the maximum and minimum values of the space $d$ being defined by the double inequality:

$$\frac{4F}{25} \leq d \leq \frac{9F}{25}$$

The group G1 comprises six elements which are, going towards an image-receiving surface formed by a film, (not shown), a first biconvex convergent element L1, a second biconcave divergent element L2, a third biconvex convergent element L3, a fourth biconcave divergent element L4, a fifth biconvex convergent element L5 and a sixth biconcave divergent element L6. The elements L1, L3, L5 have similar indexes $n1$, and the elements L2, L4, L6 have similar indexes $n2$. Each element group (L1, L2), (L3, L4) and (L5, L6) has a focal length substantially equal to three times the focal length F1 of the group G1.

The group G2 comprises five elements which are, going towards the film, a substantially plano-concave element L7 and a substantially plano-convex element L8, these two elements possibly being stuck together by way of having common curved surfaces, a divergent meniscoid element L9 of which the concave surface is disposed near the film, a convergent meniscoid element L10 of which the concave surface is disposed near the film, and a divergent meniscoid element L11 of which the concavity is disposed near the film; the elements L10 and L11 possibly being stuck together. The elements L7, L8 are made of glasses which are very similar indexes but different dispersive powers.

A lens of this kind can have an aperture of F/4 and a field of about 12°.

For good correction of geometric aberrations, the group G1 consists of three groups having substantially equal focal lengths. For the same reasons, and in contrast to known formulae for telephoto lenses, the divergent elements of the group G2 have their concavities facing to the rear, i.e., towards the film. For good correction of chromatic aberrations, the group G1 is formed by glasses which, taken in pairs, form substantially apochromatic pairs—i.e., since the extensions for the lines C and F coincide, the extension at $d$ has the same common value. The elements L7, L8 are devised to cancel the spherical overcorrection corresponding to the line F.

In the drawing, the radii of curvatures of the various lens elements are designated each by the reference R plus a first index characteristic of each element and a second index denoting the order in which the lens element surface is met going towards the film. Glass thicknesses are designated each by the reference E plus the same index as the corresponding lens element, and the spaces between two consecutive lens elements are designated each by the reference $e$ plus the two indexes of the lens elements separated by the particular space concerned.

In a preferred form of the telephoto lens in accordance with the invention, the radii of curvature of the lens elements meet the following conditions:
For the lens element L1:

$$0.5F < R11 < 0.6F$$

For the lens element L3:

$$0.5F < R31 < 0.6F$$

For the lens element L5:

$$0.4F < R51 < 0.5F$$

For instance, a lens according to the invention having a focal length F=402.45, (all dimensions being given in millimetres—m.m.) an aperture of F/4 and covering a 57 x 57 mm. format, comprises lens elements having the following characteristics.

Its physical length overall is 186.2, and the lens element surface radii of curvature R, glass thicknesses E, spaces e between lens elements, indices nd for the length d, dispersive powers V and useful diameters D of the individual lens elements are represented by the following table:

|  | Radii of curvature, R | Glass thicknesses and lens spacings, E and e | Length, d indices, nd | Dispersive powers, V | Useful lens diameters, D |
|---|---|---|---|---|---|
| L1 | R 11= 219 | E1 =10.7 | 1.61375 | 55.5 | 100 |
|  | R 12= 257.517 | e12 =0.11 |  |  |  |
| L2 | R 21=−272.185 | E2 =6.0 | 1.69664 | 36.2 | 100 |
|  | R 22= 520.115 | e23 =0 |  |  |  |
| L3 | R 31= 221.1 | E3 =10.7 | 1.61375 | 55.5 | 100 |
|  | R 32=−340.0 | e34 =0.11 |  |  |  |
| L4 | R 41=−334.965 | E4 =6.0 | 1.69664 | 36.2 | 100 |
|  | R 42=+701.284 | e45 =0 |  |  |  |
| L5 | R 51= 187 | E5 =10.7 | 1.61375 | 55.5 | 100 |
|  | R 52=−500.258 | e56 =0.11 |  |  |  |
| L6 | R 61=−477.527 | E6 =6 | 1.69664 | 36.2 | 100 |
|  | R 62= 510.563 | e67 =68.9 |  |  |  |
| L7 | R 71= ∞ | E7 =3.2 | 1.62375 | 56.9 | 58 |
|  | R 72= 77 | e78 =0 | (lens elements stuck together) |  |  |
| L8 | R 81= 77 | E8 =10.7 | 1.62025 | 36.2 | 58 |
|  | R 82= ∞ | e89 =0 |  |  |  |
| L9 | R 91= 92.94 | E9 =4 | 1.69675 | 55.8 | 55 |
|  | R 92= 71.5 | e9.10 =2.7 |  |  |  |
| L10 | R101= 122.62 | E10 =4 | 1.788 | 47.5 | 52 |
|  | R102= 165.15 | e10.11=0 | (lens elements stuck together) |  |  |
| L11 | R111= 165.15 | E11 =4 | 1.5315 | 49.0 | 52 |
|  | R112= 71.5 |  |  |  |  |

The invention is not of course limited by details of the embodiment which has just been described, and such details can vary without departure from the scope of the invention.

What we claim is:

1. A telephoto lens for use in conjunction with an image-receiving surface, consisting of two lens groups designated G1 and G2, of which the lens group G2 is arranged to be the nearer one to said surface, the lens groups G1 and G2 having six and five elements respectively, the six elements of the group G1 being a convergent group formed by, going towards the image-receiving surface, a first biconvex convergent element, a second biconcave divergent element, a third biconvex convergent element, a fourth biconcave divergent element, a fifth biconvex convergent element and a sixth biconcave divergent element, and the five elements of the group G2 being a divergent group formed by, going towards the image-receiving surface, a seventh plano-concave element, an eighth plano-convex element, a ninth divergent meniscoid element, a tenth convergent meniscoid element and an eleventh divergent meniscoid element.

2. A telephoto lens as claimed in claim 1, wherein the first and second elements, the third and fourth elements and the fifth and sixth elements form three doublets of substantially the same power.

3. A telephoto lens as claimed in claim 1, wherein the seventh and eighth elements are stuck together, the indices of the glasses of which such elements are made being similar and their dispersive powers being different.

4. A telephoto lens as claimed in claim 1, wherein the ninth, tenth and eleventh elements are menisci of each of which the concave surface is disposed towards the image-receiving surface.

References Cited

UNITED STATES PATENTS 2,187,780  1/1940  Gehrke et al. _____ 350—216
2,629,285  2/1953  Baker _____ 350—215 X

FOREIGN PATENTS 1,368,865  6/1964  France.

JOHN K. CORBIN, Primary Examiner